(12) United States Patent
Parekh (10) Patent No.: US 10,489,771 B2
(45) Date of Patent: Nov. 26, 2019

(54) METHOD AND SERVER FOR CREDITING A MONETARY AMOUNT TO A BENEFICIARY ACCOUNT

(71) Applicant: MASTERCARD INTERNATIONAL INCORPORATED, Purchase, NY (US)

(72) Inventor: Pravin Parekh, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 411 days.

(21) Appl. No.: 15/398,275

(22) Filed: Jan. 4, 2017

(65) Prior Publication Data

US 2017/0193486 A1 Jul. 6, 2017

(30) Foreign Application Priority Data

Jan. 6, 2016 (SG) .......................... 10201600070Y (51) Int. Cl.
*G06Q 20/24* (2012.01)
*G06Q 20/10* (2012.01)
*G06Q 20/26* (2012.01)
*G06Q 20/34* (2012.01)
*G06Q 20/40* (2012.01)

(52) U.S. Cl.
CPC .......... *G06Q 20/24* (2013.01); *G06Q 20/10* (2013.01); *G06Q 20/26* (2013.01); *G06Q 20/35785* (2013.01); *G06Q 20/405* (2013.01)

(58) Field of Classification Search
None
See application file for complete search history.

(56) References Cited

U.S. PATENT DOCUMENTS

| 2012/0185512 | A1* | 7/2012 | McCully | G06F 16/903 707/794 |
| 2014/0304186 | A1* | 10/2014 | Brown | G06Q 30/0279 705/329 |
| 2015/0262183 | A1* | 9/2015 | Gervais | G06Q 20/10 705/44 |
| 2017/0091765 | A1* | 3/2017 | Lloyd | G06Q 20/32 |

* cited by examiner

*Primary Examiner* — Roy Y Yi
(74) *Attorney, Agent, or Firm* — Harness, Dickey & Pierce, P.L.C.

(57) ABSTRACT

According to a first aspect of the disclosure, there is provided a method for crediting a monetary amount to a beneficiary account from which payments are made, the method comprising: identifying, to a server administering the crediting of the beneficiary account, the beneficiary account to which the monetary amount is to be credited; receiving, at the server, an indication of the monetary amount to credit the beneficiary account; comparing the monetary amount against records of past amounts credited into other beneficiary accounts, the records being stored in a database of the server; generating a result of the comparison; and crediting the beneficiary account with the monetary amount.

17 Claims, 9 Drawing Sheets

METHOD AND SERVER FOR CREDITING A MONETARY AMOUNT TO A BENEFICIARY ACCOUNT

CROSS-REFERENCE TO RELATED APPLICATION

This application claims the benefit of and priority to Singapore Patent Application No. 10201600070Y, filed Jan. 6, 2016. The entire disclosure of the above application is incorporated herein by reference.

FIELD

The following discloses a method and server for crediting a monetary amount to a beneficiary account.

BACKGROUND

This section provides background information related to the present disclosure which is not necessarily prior art.

It is one of several responsibilities of a donor, such as a guardian or a parent, to provide a beneficiary under his care, such as a ward or child, with an allowance to cover the beneficiary's expenditure.

This allowance is traditionally given in the form of cash. The capability of smart phones, or mobile phones with an advanced mobile operating system which allow for electronic payment of goods and/or services through the use of digital wallet technology provide a means to change this traditional model. For example, digital wallet technology, is able to access gift cards that are made out to a beneficiary, where the beneficiary can use such gift cards, instead of cash, to make purchases.

However, gift cards have limitations—they are only usable at participating merchants. Also, providing cash in a digital form to a beneficiary does not assist the donor on several factors: such as deciding on an amount to give to the beneficiary or awareness of how the beneficiary spends the digital money. The donor may check forums to get a feel on typical amounts given to children, but the accuracy of information obtained in this manner is dependent on the honesty of such forum contributors.

There is thus a need to improve upon the way in which a beneficiary account is credited.

SUMMARY

This section provides a general summary of the disclosure, and is not a comprehensive disclosure of its full scope or all of its features. Aspects and embodiments of the disclosure are also set out in the accompanying claims.

According to a first aspect of the present disclosure, there is provided a method for crediting a monetary amount to a beneficiary account from which payments are made, the method comprising: identifying, to a server administering the crediting of the beneficiary account, the beneficiary account to which the monetary amount is to be credited; receiving, at the server, an indication of the monetary amount to credit the beneficiary account; comparing the monetary amount against records of past amounts credited into other beneficiary accounts, the records being stored in a database of the server; generating a result of the comparison; and crediting the beneficiary account with the monetary amount.

According to a second aspect of the present disclosure, there is provided a server for administering the crediting of a beneficiary account from which payments are made, the server comprising: at least one processor; and at least one memory including computer program code; the at least one memory and the computer program code configured to, with the at least one processor, cause the server at least to: receive an indication of the beneficiary account to which a monetary amount is to be credited; receive an indication of the monetary amount to credit the beneficiary account; compare the monetary amount against records of past amounts credited into other beneficiary accounts, the records being stored in a database of the server; generate a result of the comparison; and credit the beneficiary account with the monetary amount.

Further areas of applicability will become apparent from the description provided herein. The description and specific examples and embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. With that said, embodiments of the disclosure will be better understood and readily apparent to one of ordinary skill in the art from the following written description, by way of example only, and in conjunction with the drawings, in which.

DETAILED DESCRIPTION

Embodiments of the present disclosure will be described, by way of example only, with reference to the drawings. The description and specific examples included herein are intended for purposes of illustration only and are not intended to limit the scope of the present disclosure. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other computing device selectively activated or reconfigured by a computer program stored therein. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices, such as magnetic or optical disks, memory chips, or other storage devices suitable for interfacing with a computer. The computer readable medium may also include a hard-wired medium, such as exemplified in the Internet system, or wireless medium such as exemplified in the GSM mobile telephone system. The computer program, when loaded and executed on a computer, effectively results in an apparatus that implements the steps of the method(s) herein.

Figure 1:
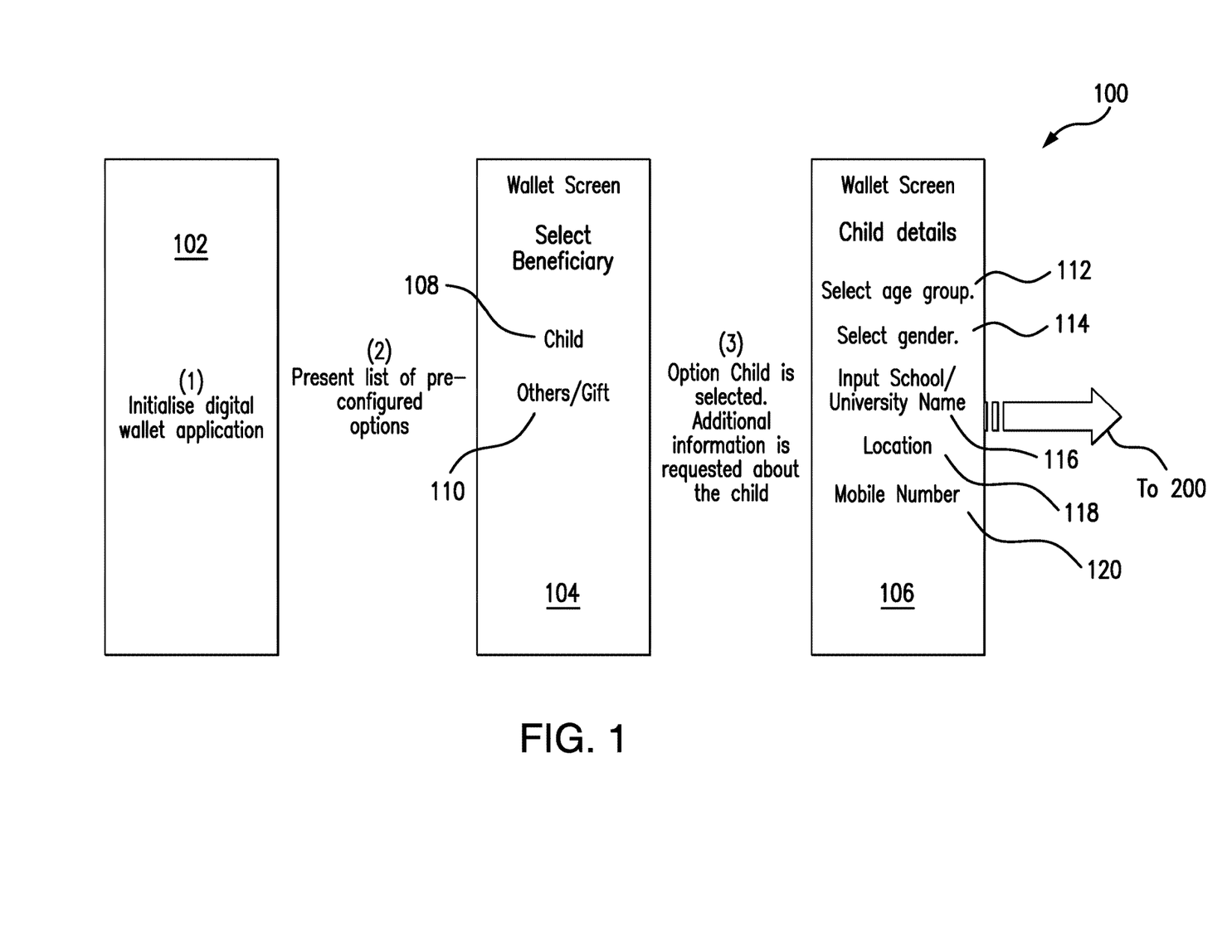
FIGS. 1 to 3 each show stages of a process that electronically credits an account with a monetary amount which a beneficiary of the account can withdraw.
Figure 2:
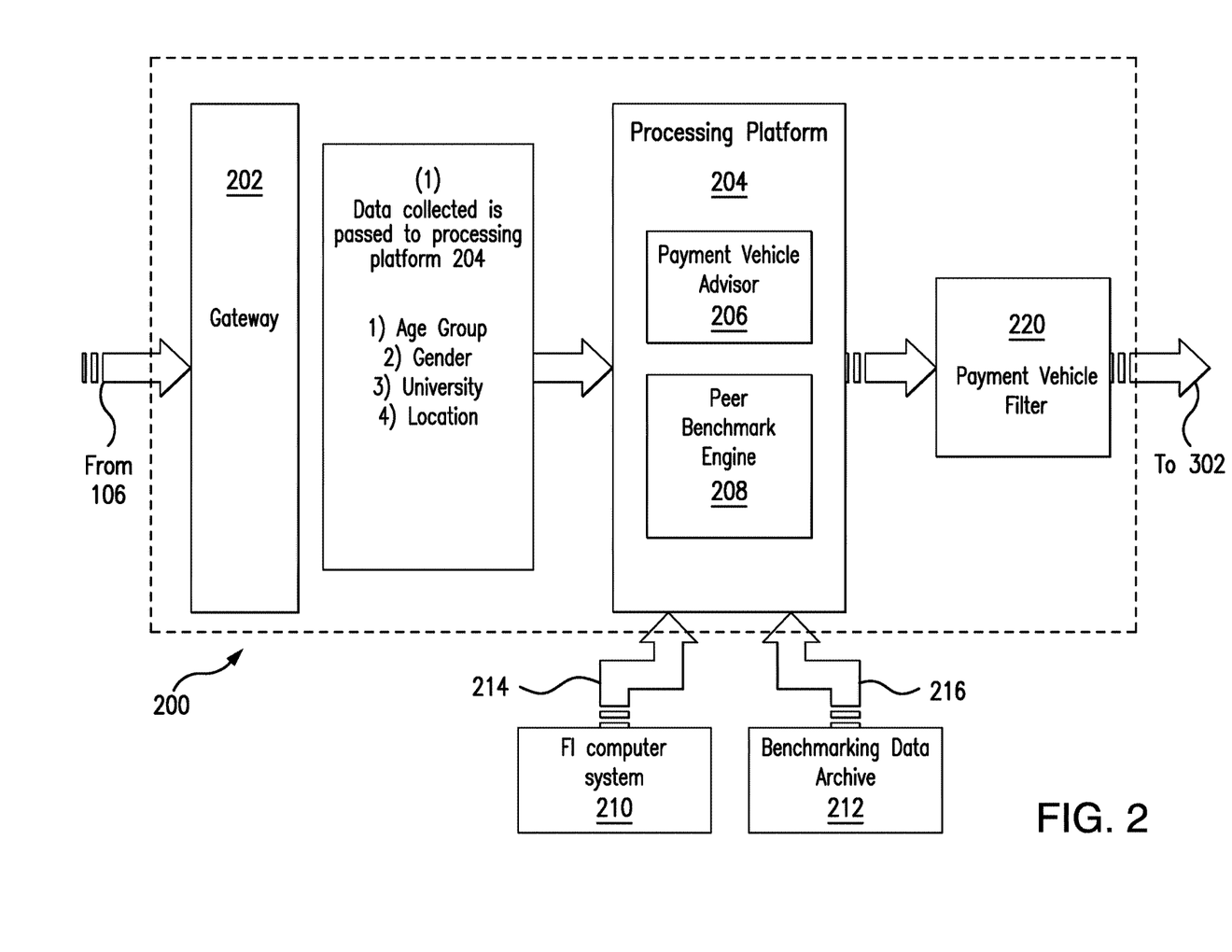
Figure 3:
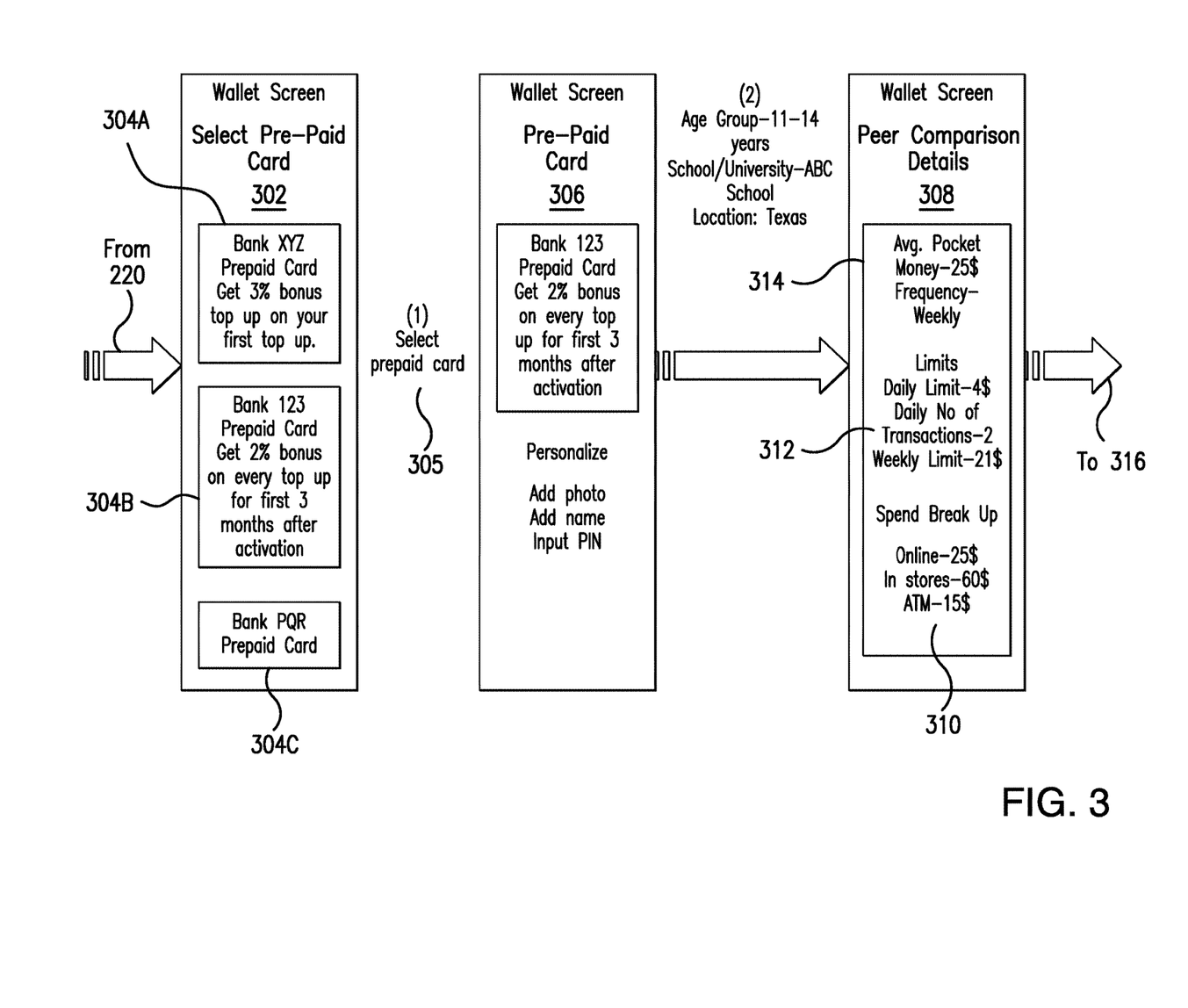

FIGS. 1 to 3 each show stages of a process that electronically credits an account with a monetary amount, from which a beneficiary of the account can withdraw. FIGS. 1 to 3 illustrate this process using a child as the beneficiary, where the account is set up so as to provide the child with pocket money. It will be appreciated that this is simply one use of the process shown in FIGS. 1 to 3 and that other processes can also be applied for other uses. The beneficiary may be a holder of the account who is able to access the account to withdraw money or may be a party amongst several designated parties who can also withdraw money from the account.

FIG. 1 shows the initial stages of the process, wherein these initiation stages are performed at a donor end, i.e. the party who credits the beneficiary account. When the process is used to provide a child with pocket money, the beneficiary account may be configured to only allow or authorise a predefined list of individuals to credit the beneficiary account, such as the child's parents or relatives. This provides a tool that assists the parents to ensure that the child's pocket money comes from a known source. The term "donor" and "parent" may be used interchangeably in the remainder of the disclosure.

At stage 102, an application is started that allows the donor to credit the beneficiary account with a monetary amount or funds. The application may be a digital wallet application which supports several functions, one of them providing the module capability to support the crediting of the beneficiary account. On the other hand, the application may be dedicated to only providing a platform for supporting the necessary data communication exchange that facilitates the crediting of the beneficiary account. This application may be hosted on a web portal, which the donor accesses through an internet browser. Alternatively, this application may be installed in the donor's mobile device, such as a tablet or a mobile phone. In either implementation, the donor selects an option that initiates the crediting of money/funds into the beneficiary account.

The application responds by presenting a list of pre-configured options, as shown in stage 104 of FIG. 1. While there may be more pre-configured options, depending on the number of functions that the application is able to support, only two options 108 and 110 are shown in stage 104. Both options 108 and 110 allow the donor to select a beneficiary of the monetary amount to be credited. The first option 108 allows the donor to select his child as the beneficiary, while the second option 110 allows the donor to provide the money as a gift to another recipient. As mentioned above, since FIGS. 1 to 3 focus on the child as the beneficiary, the second option 110 is not further discussed. The completion of stage 104 serves to identify the beneficiary account to which the monetary amount is to be credited.

Stage 106 occurs as a result of the donor selecting option 108 in stage 104. At stage 106, the application displays several fields 112 to 120 that allow the donor to provide details of the holder of the beneficiary account. The field 112 allows the donor to enter an age group in which the child belongs. The field 114 allows the donor to select the child's gender. The field 116 allows the donor to enter the child's school. The field 118 allows the donor to enter the address of the donor. The field 120 allows the donor to select the child's mobile number. These fields 112 to 120 may need to be completed the first time the donor uses the application to credit his child's account or if there is a change in the child's details.

The data of these fields 112, 114, 116, 118 and 120 is sent to a gateway 202 (see FIG. 2) of a server 200 that administers the process that electronically credits the beneficiary account with the monetary amount from the donor. In addition, an indication of the monetary amount to credit the beneficiary account is sent to the server 200. This indication may be done at either stage 102 or stage 106. In one implementation, this indication of the monetary amount is a sum of money that the donor considers crediting the beneficiary account and is not the final amount that the donor eventually credits the beneficiary account. The final amount may be decided and sent as a step that is separate and subsequent to this indication of the monetary amount. The identification of the beneficiary account to which the monetary amount is to be credited (this identification being obtained at the completion of stage 104) is also sent to the server 200. Thus, the data packet that is sent to the server 200 at the end of stage 106 includes an indication of the monetary amount to credit the beneficiary account; the identification of the beneficiary account to which the monetary amount is to be credited; and profile details of the holder of the beneficiary account.

FIG. 2 shows the stages which are performed at the server 200. As mentioned above, FIG. 2 shows part of a process, spanning over FIGS. 1 to 3, that electronically credits an account with a monetary amount. The server 200 administers this process, in that it provides system architecture that allows the donor to interface with the financial institution which maintains the beneficiary account for his child. That is, the server 200 administers the crediting of the beneficiary account.

The server 200 is understood to mean a single computing device or a plurality of interconnected computing devices. The server 200 may exist as a single hardware unit or be distributed among several hardware units. The purpose of the server 200 is to connect the various computing devices (such as the donor's mobile device and a financial institution server which provides for crediting into the beneficiary account) where the process shown over FIGS. 1 to 3 is implemented. While these various computing devices use the process, they do not administer the process, which is the server's 200 responsibility. In administering this process, the server 200 receives data packets from one of these computing devices (such as the donor's mobile device) and directs the communication packets to another of these computing devices (such as the financial institution server), whereby these data packets enable the computing devices to perform their respective functions which leads to the beneficiary account being credited with the monetary amount. The links that the server 200 establishes are therefore data communication channels between the server 200 and the various connected computing devices. Considering the four party model used by Visa® or MasterCard® to process a payment transaction made using their card, the server 200 may be realised by the Visa® or MasterCard® network of the four party model.

From the completion of stage 106 of FIG. 1, the gateway 202 of the server 200 receives a data packet that contains an indication of the monetary amount to credit the beneficiary account; the identification of the beneficiary account to which the monetary amount is to be credited; and profile details of the holder of the beneficiary account. The gateway 202 passes the data packet to a processing platform 204 of the server 200.

The processing platform 204 serves to assist a donor to determine an amount to credit a beneficiary account, which in the case of FIG. 1, helps a parent to determine an amount of pocket money to give his child. This is done through a peer benchmarking engine module 208 of the processing platform 204. To perform the task of assisting a donor to determine an amount to credit a beneficiary account, the peer benchmarking engine module 208 processes a portion of the profile details of the holder of the beneficiary account, specifically the data of the fields 112, 114, 116 and 118 shown in FIG. 1, against data stored in a benchmarking data archive 212. This benchmarking data archive 212 also contains records of past monetary amounts that donors have credited into other beneficiary accounts, from previous transactions processed by the processing platform 204. This previous transaction data (i.e. profile details of other beneficiary accounts and monetary amounts credited into them) is extracted 216 from the benchmarking data archive 212 when the processing platform 204 performs any current comparison. The peer benchmarking engine module 208 analyses the previous transactional data to locate records of past monetary amounts into other beneficiary accounts having a beneficiary profile that matches that of the current beneficiary account that is being credited. Once such records are located, the indication of the monetary amount to credit the current beneficiary account is then compared against the monetary amount that is credited into these other beneficiary accounts. A result of the comparison is then generated. The comparison result is later provided to the donor of the current beneficiary account (described in further detail below in stage 308 of FIG. 3). If the donor finds that the monetary amount he has indicated he would credit into the beneficiary account does not fall within a range of amounts given to other beneficiaries with similar profiles, the donor can then adjust the amount that is finally credited into the beneficiary account, in response to the result of the comparison. Accordingly, the monetary amount to which the beneficiary account is credited may be different from the monetary amount received by the peer benchmarking engine module 208 to perform the comparison.

The result of the comparison may be generated before or after the crediting of the beneficiary account. In the case where the comparison result is generated after the crediting of the beneficiary account, the beneficiary account may then experience multiple transactions since the credited amount may be increased should the donor choose to make adjustments as a result of the comparison result. In the other case where the comparison result is generated before the crediting of the beneficiary account, then the beneficiary account receives the monetary amount in a single transaction. Such a comparison result is able to assist a parent to decide a monetary amount that is to be credited into his child's account. In the case where the comparison result is generated before the crediting of the beneficiary account, the monetary amount which the donor indicates the beneficiary account may be part of a pre authorisation step in order for the donor's indicated amount to be compared against data stored in the benchmarking data archive 212. The indicative amount is only credited upon the donor's confirmation, which would be sought after the comparison results are shown to the donor.

From stage 106 of FIG. 1, the details that are used to perform the profile match comprise any one or more of: age; gender; address; and school of both the beneficiary account being credited and the beneficiary account from the previous transactional data. Further details, such as the household category, may also be used.

The processing platform 204 is also provided with a payment vehicle advisor module 206 that serves to provide a list of payment vehicles through which the beneficiary can access the beneficiary account. Examples of payment vehicles include a credit card, a debit card or a prepaid card that is registered to an account holder. These payment vehicles are in electronic form, i.e. stored in a digital wallet application, although they may also be in physical form. Each of these payment vehicles may be provided by computer systems 210 of one or more participating financial institutions, which upload 214 data of their provided payment vehicles that are configurable to access the monetary account that is credited into the beneficiary account. Each of these payment vehicles may be packaged with value added service that may influence the donor's choice on the selection one or more payment vehicles that allows the beneficiary to access his account. Value added services refer to benefits provided by the participating financial institutions for choosing their payment vehicles to access the monetary account that is credited into the beneficiary account. Such benefits include any one or more of: coupons, offers, or a bonus to the credited monetary account. The benefits may also include awarding of reward points to a loyalty program.

A loyalty program refers to a structured marketing effort that rewards, and therefore encourages, loyal buying behaviour from a same merchant.

From the above, FIGS. 1 and 2 allow for the execution of a method for crediting a monetary amount to a beneficiary account from which payments are made. The method is summarised in steps 402, 404, 406, 408 and 410 of FIG. 4. At step 402 the beneficiary account to which the monetary amount is to be credited is identified to the server 200 administering the beneficiary account. At step 404, the server 200 receives an indication of the monetary amount to credit the beneficiary account. As mentioned above, this indication may be done at either stage 102 or stage 106 of FIG. 1. At step 406, the indicated monetary amount is compared against records of past amounts credited into other beneficiary accounts, the records being stored in a database of the server 200. This comparison was discussed above using previous transaction data stored in the benchmarking data archive 212 of the server 200. At step 408, a result of the comparison is generated, described above as occurring before or after the crediting of the beneficiary account. At step 410, the beneficiary account is credited with the monetary amount Returning to FIG. 2, the payment vehicle advisor module 206 and the peer benchmarking engine module 208 are both realised by a processor and memory (both described later in FIG. 7) of the payment vehicle advisor module 206. This processor and memory may also be configured to provide a payment vehicle filtering module 220 that analyses data from the payment vehicle advisor module 206 on the various payment vehicles received and the comparison result data from the peer benchmarking engine module 208 to eliminate payment vehicles that would likely not be those that the donor will use and provide a list of payment vehicles that may be of interest for the donor's selection. The payment vehicle advisor module 206 shortlists such payment vehicles by determining (from the earlier described data uploaded 214) the benefits provided by each of the payment vehicles and accessing whether they are a likely fit for a particular circumstance, i.e. the profile needs of a present donor. The payment vehicle advisor module 206 may apply rules that match the benefits of the payment vehicles against the details of the beneficiary and previous transactional data stored in the benchmarking data archive 212 and may also factor in selected payment vehicles in previous crediting transactions. A data packet which includes data of these shortlisted payment vehicles is returned to the application, discussed in FIG. 1, used to credit the beneficiary account with a monetary amount or funds. This data packet also includes the comparison results generated, as discussed above, by the peer benchmarking engine module 208.

FIG. 3 shows the final stages of the process spanning over FIGS. 1 to 3. These final stages are performed by the application that allows the donor to credit the beneficiary account with a monetary amount.

At stage 302, the application receives data on the payment cards shortlisted by the payment vehicle filtering module 220 of FIG. 2, which provides the application with a list of payment vehicles through which the beneficiary account is debited from payments made from the beneficiary account. The shortlisted payment cards 304A, 304B and 304C are displayed, along with each of their associated value added services. The application may then receive, at 305, an indication of the selected one(s) of the payment vehicles from the donor.

At stage 306, the application displays the selected one(s) of the payment vehicles (being, for example, card 304B from stage 302). The application may be further configured to allow the donor to personalise the selected one(s) of the payment vehicles by printing thereon: a photo of the beneficiary and/or the name of the beneficiary. In addition, the selected one(s) of the payment vehicles may be password protected, e.g. a correct PIN has to be input before access to the beneficiary account is granted.

At stage 308, the comparison result generated by the peer benchmarking engine module 208, as discussed with respect to FIG. 2, is displayed (see reference numeral 314). The comparison result 314 may show how the amount the donor has credited into the current beneficiary account measures against other amounts credited into other beneficiary accounts, where these other beneficiary accounts belong to recipients having a similar profile to the current beneficiary. In the implementation where the donor only credits the current beneficiary account after he is provided with the result of the comparison, then the monetary amount, which the donor indicates he will be crediting the current beneficiary account, is used as the basis for comparison.

In addition to providing comparison results, stage 308 may also see other statistics being displayed. Such statistics may include: i) categories 310 under which deductions from the beneficiary account fall, such as for Internet purchases, retail spending or ATM withdrawals; and/or ii) restrictions 312 placed upon the beneficiary account, such as a limit on: a) daily withdrawal; b) number of withdrawal transactions; and c) weekly limit withdrawal.

While FIG. 3 shows that the comparison result 314 is shown after the selection of the one or more payment vehicles shown in stage 302, the comparison result may be shown after the selection of the one or more payment vehicles.

At stage 316, the application provides for the donor to credit the beneficiary account with the monetary amount, in the implementation where the comparison result of stage 308 is shown before the donor decides on a final figure. In the alternative implementation where the comparison result of stage 308 is shown after the donor has credited the beneficiary account with the monetary amount, the application will then allow the donor to adjust the credited monetary amount, which leads to either an increase or decrease in the credited amount. In addition, stage 316 sees the application allowing configuration of the selected one(s) of the payment vehicles with at least one restriction that controls access to the monetary amount credited into the beneficiary account. The at least one restriction may be selected from a group comprising any one or more of: transaction limit 318; frequency of transaction; and transaction category 320. The application can then send 322 all these confirmed settings to the gateway 202 of the server 200 described in FIG. 2.

The gateway 202 may archive the monetary amount credited into the beneficiary account, along with the profile of the beneficiary account, into the benchmarking data archive 212 shown in FIG. 2. Such archiving allows the data created in the present transaction to be used for benchmarking in other future transactions done in accordance with the method shown in FIG. 4.

The gateway 202 communicates 324 with a computing system of a financial institution which maintains the beneficiary account (e.g. of the child) to credit the beneficiary account with the monetary amount. This monetary amount may be deducted from an account (e.g. of the parent) that is maintained by a different financial institution or it may be from an account that is maintained by the same financial institution of the beneficiary account. Both the financial institutions that maintain the beneficiary account and the account from which the beneficiary account is credited are collectively shown using reference numeral 326 in FIG. 3. Accordingly, the server 200 of the gateway 202 may be configured to designate an account from which the monetary amount is deducted to credit the beneficiary account. This designated account may be further configured to deduct the monetary amount in accordance with a schedule. The data communication 324 between the one or more financial institutions to effect the monetary amount transfer is well known in the art and is therefore not elaborated. After the beneficiary account is successfully credited with the monetary account, the gateway 202 sends 328 a notification to a mobile device 330 that the beneficiary owns.

Figure 5:
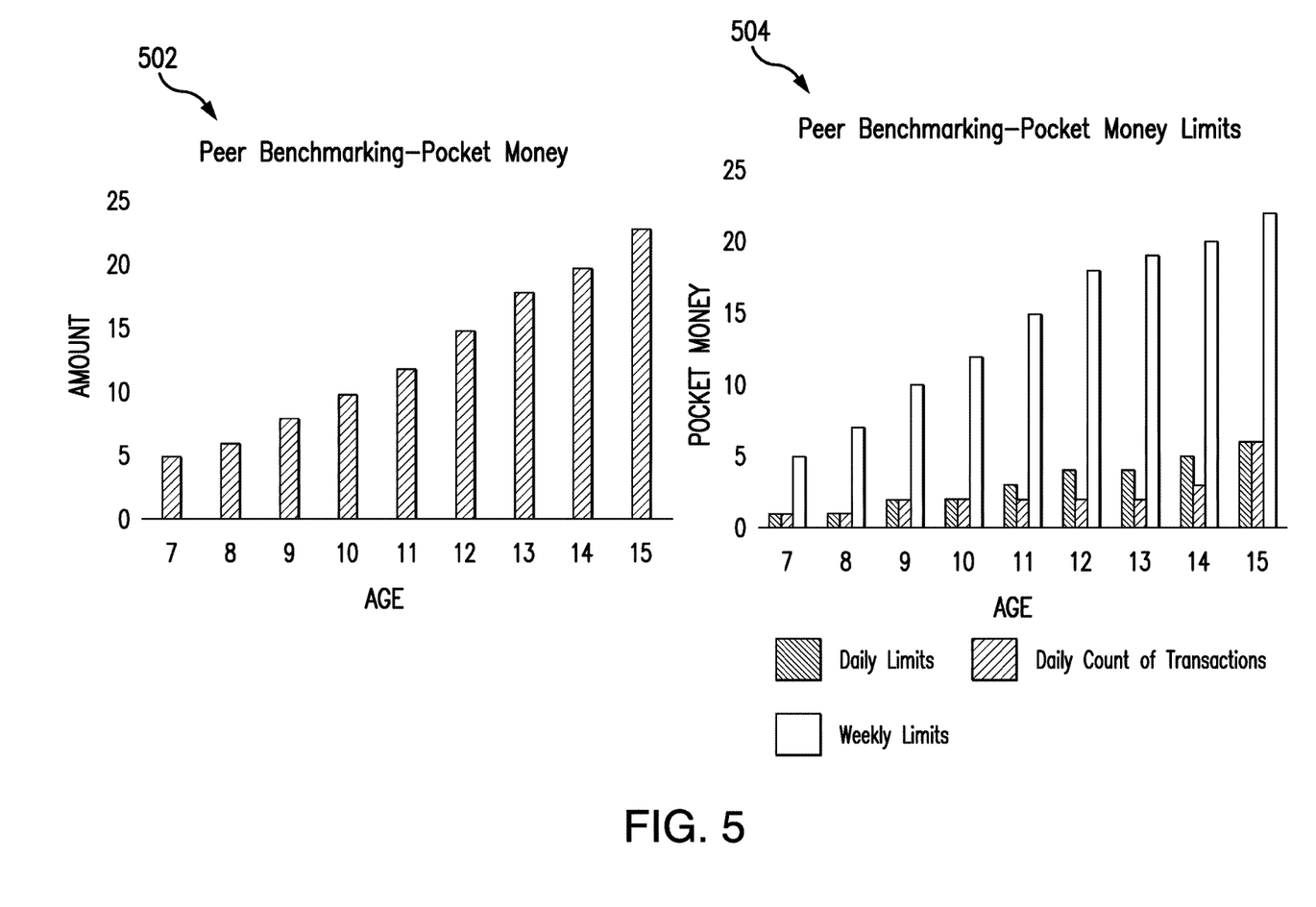
FIG. 5 shows samples of comparison results that may be shown as part of the method of FIG. 4.

FIG. 5 shows samples 502, 504 and 506 of the comparison results that may be shown in stage 308 of FIG. 3. Sample 502 shows an average amount that is credited into other beneficiary accounts. Sample 504 shows restrictions that are imposed onto other beneficiary accounts, these restrictions being, for example, a daily and weekly withdrawal limit. Sample 506 shows spend categories of other beneficiary accounts. In each of these samples, the vertical axis represents a monetary value, while the horizontal axis represents the age of the beneficiary. These comparison results provide the parent with a gauge on the amount of pocket money their child may need and assists the parent to determine reasonable restrictions that may be placed to control the manner in which the pocket money is used.

Figure 6:
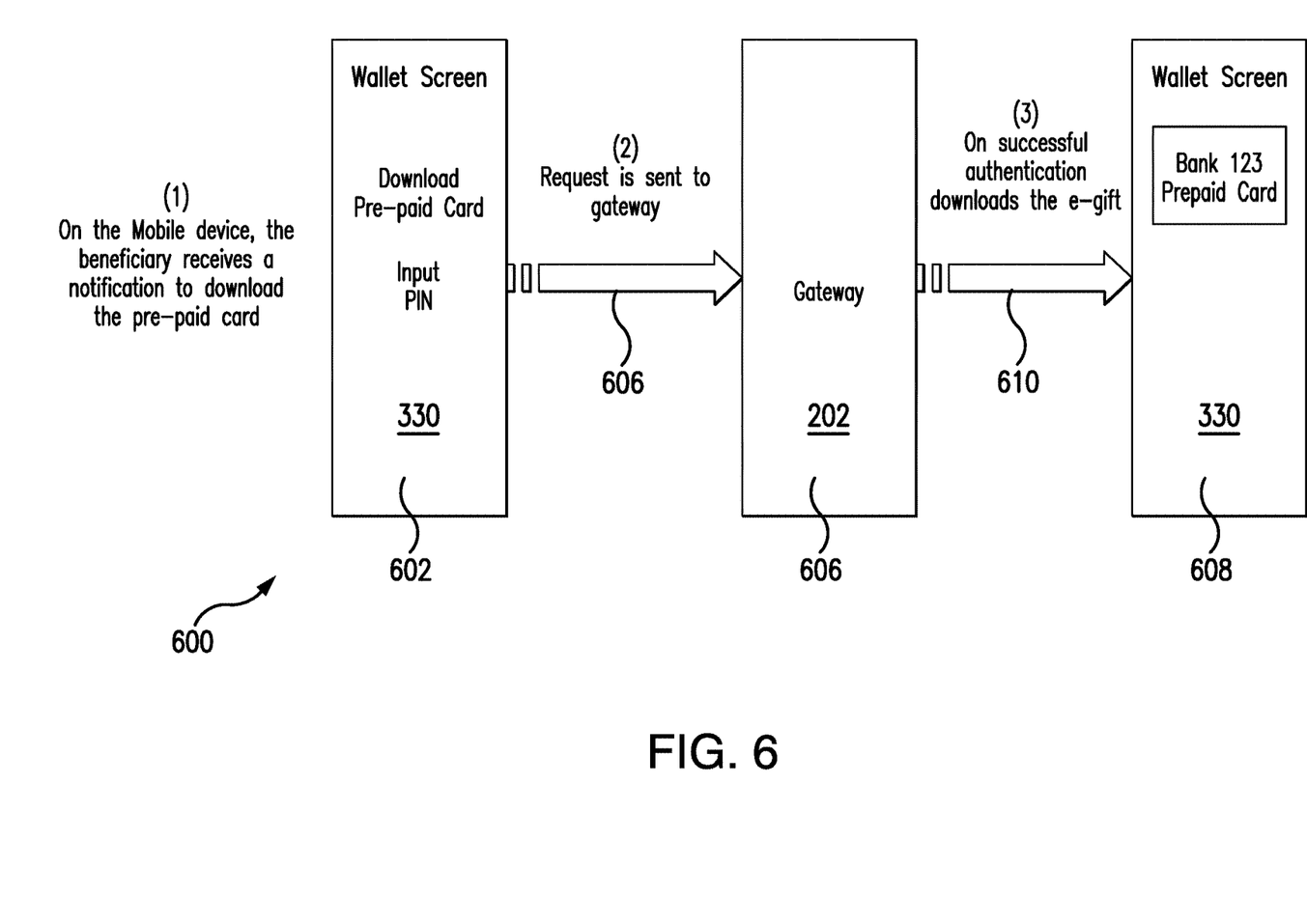
FIG. 6 shows a process flow which may be followed when a beneficiary seeks to access the money credited into his account.

FIG. 6 shows a process flow 600 which may be followed when the beneficiary seeks to access the money credited into his account. This process flow 600 may follow after, with reference to FIG. 3, the gateway 202 sends 328 a notification to the mobile device 330 that the beneficiary owns.

In step 602, the mobile device 330 receives the notification that the beneficiary account has been credited, along with details of a payment vehicle which is usable to access the beneficiary account. The mobile device 330 may request a PIN to be input in order to access the payment vehicle. Alternatively, other forms of user authentication, such as biometric authentication (e.g. by fingerprint or facial recognition) may be requested by the mobile device 330 in order to provide access to the payment vehicle.

Upon receiving the PIN, the mobile device 330 sends 608 a request to the gateway 202 for access to the payment vehicle. On successful authentication, the gateway 202 sends 610 details of the payment vehicle to a digital wallet application installed at the mobile device 330. The gateway 202 then sets up the necessary communication link to the financial institution (see reference numeral 326 in FIG. 3) to debit the beneficiary account whenever the payment vehicle is used to make a purchase.

Figure 4:
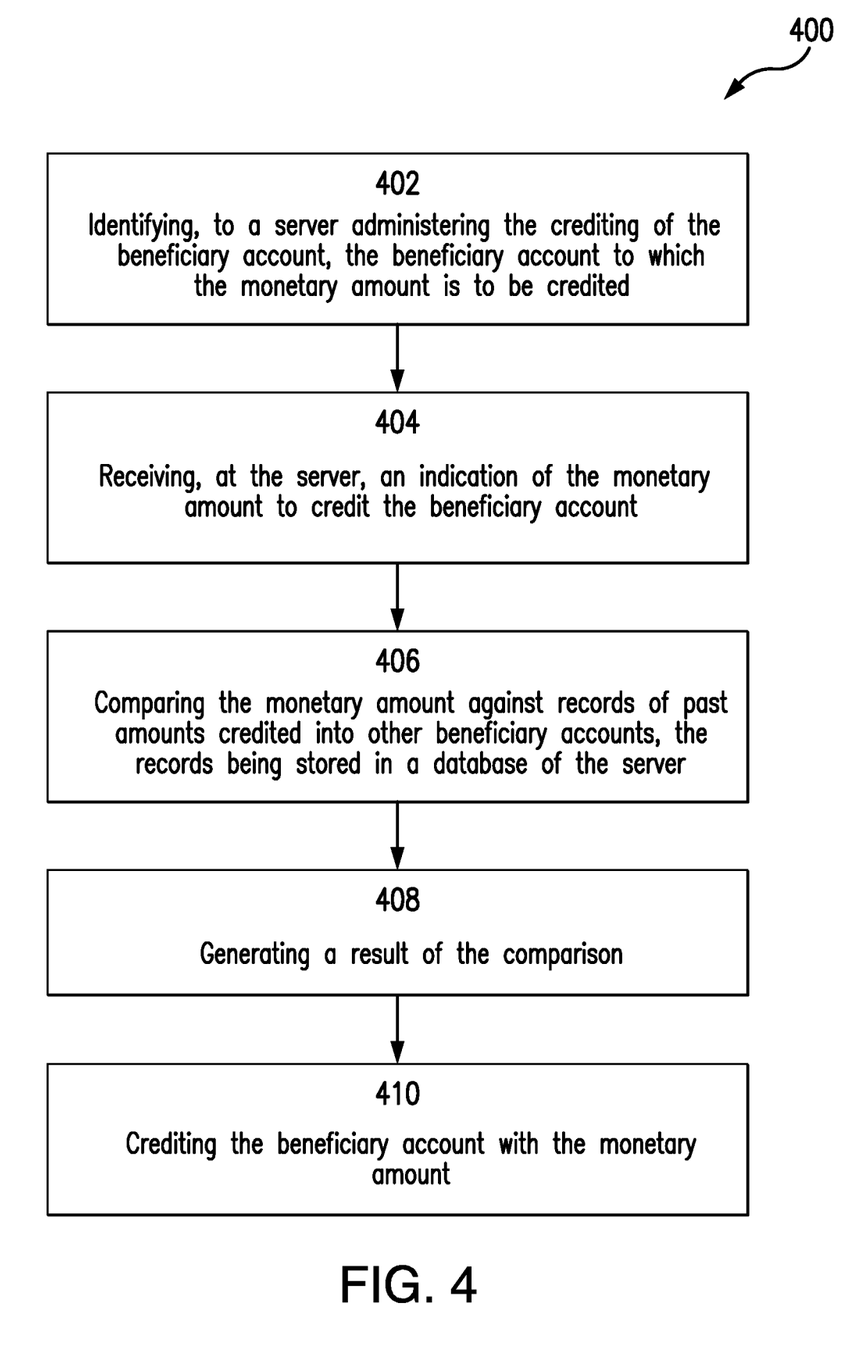
FIG. 4 shows a method implemented by the server shown in FIG. 2, the method allowing crediting of a monetary amount into a beneficiary account.
Figure 7:
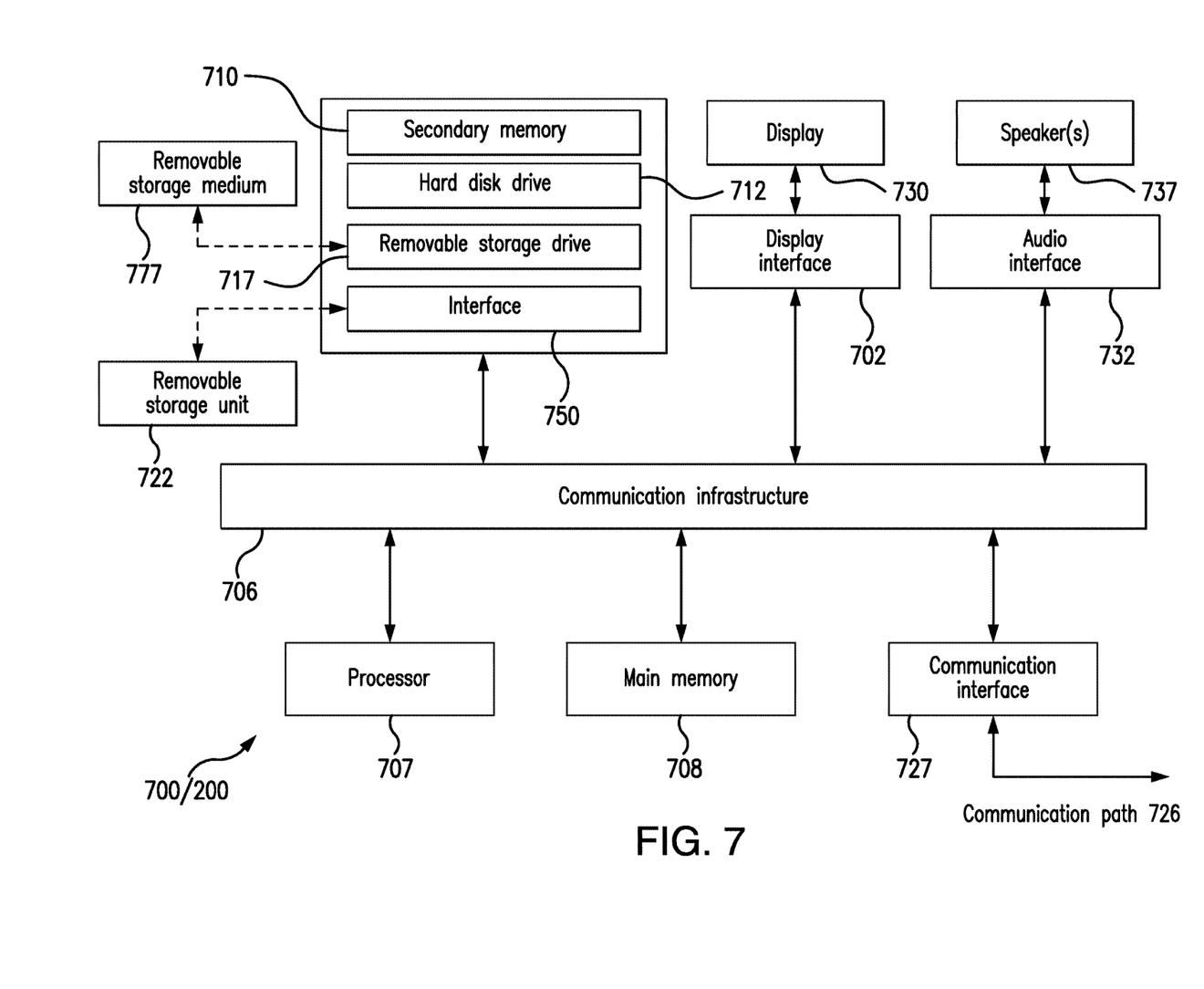
FIG. 7 shows a schematic of a computing device used to realise the server shown in FIG. 2.

FIG. 7 depicts an exemplary computing device 700, hereinafter interchangeably referred to as a computer system 700, where one or more such computing devices 700 may be used to execute the method of FIG. 4. The exemplary computing device 700 can be used to implement the server 200 shown in FIG. 2. The following description of the computing device 700 is provided by way of example only and is not intended to be limiting.

As shown in FIG. 7, the example computing device 700 includes a processor 707 for executing software routines. Although a single processor is shown for the sake of clarity, the computing device 700 may also include a multi-processor system. The processor 707 is connected to a communication infrastructure 706 for communication with other components of the computing device 700. The communication infrastructure 706 may include, for example, a communications bus, cross-bar, or network. 7

The computing device 700 further includes a main memory 708, such as a random access memory (RAM), and a secondary memory 710. The secondary memory 710 may include, for example, a storage drive 712, which may be a hard disk drive, a solid state drive or a hybrid drive and/or a removable storage drive 717, which may include a magnetic tape drive, an optical disk drive, a solid state storage drive (such as a USB flash drive, a flash memory device, a solid state drive or a memory card), or the like. The removable storage drive 717 reads from and/or writes to a removable storage medium 777 in a well-known manner. The removable storage medium 777 may include magnetic tape, optical disk, non-volatile memory storage medium, or the like, which is read by and written to by removable storage drive 717. As will be appreciated by persons skilled in the relevant art(s), the removable storage medium 777 includes a computer readable storage medium having stored therein computer executable program code instructions and/or data.

In an alternative implementation, the secondary memory 710 may additionally or alternatively include other similar means for allowing computer programs or other instructions to be loaded into the computing device 700. Such means can include, for example, a removable storage unit 722 and an interface 750. Examples of a removable storage unit 722 and interface 750 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 722 and interfaces 750 which allow software and data to be transferred from the removable storage unit 722 to the computer system 700.

The computing device 700 also includes at least one communication interface 727. The communication interface 727 allows software and data to be transferred between computing device 700 and external devices via a communication path 726. In various embodiments of the disclosures, the communication interface 727 permits data to be transferred between the computing device 700 and a data communication network, such as a public data or private data communication network. The communication interface 727 may be used to exchange data between different computing devices 700, which such computing devices 700 form a part of an interconnected computer network. Examples of a communication interface 727 can include a modem, a network interface (such as an Ethernet card), a communication port (such as a serial, parallel, printer, GPIB, IEEE 1394; RJ45, USB), an antenna with associated circuitry and the like. The communication interface 727 may be wired or may be wireless. Software and data transferred via the communication interface 727 are in the form of signals which can be electronic, electromagnetic, optical or other signals capable of being received by communication interface 727. These signals are provided to the communication interface via the communication path 726.

As shown in FIG. 7, the computing device 700 further includes a display interface 702 which performs operations for rendering images to an associated display 730 and an audio interface 732 for performing operations for playing audio content via associated speaker(s) 737.

As used herein, the term "computer program product" may refer, in part, to removable storage medium 777, removable storage unit 722, a hard disk installed in storage drive 712, or a carrier wave carrying software over communication path 726 (wireless link or cable) to communication interface 727. Computer readable storage media refers to any non-transitory, non-volatile tangible storage medium that provides recorded instructions and/or data to the computing device 700 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 700. Examples of transitory or non-tangible computer readable transmission media that may also participate in the provision of software, application programs, instructions and/or data to the computing device 700 include radio or infra-red transmission channels as well as a network connection to another computer or networked device, and the Internet or Intranets including e-mail transmissions and information recorded on Websites and the like.

The computer programs (also called computer program code) are stored in main memory 708 and/or secondary memory 710. Computer programs can also be received via the communication interface 727. Such computer programs, when executed, enable the computing device 700 to perform one or more features of embodiments discussed herein. In various embodiments, the computer programs, when executed, enable the processor 707 to perform features of the above-described embodiments. Accordingly, such computer programs represent controllers of the computer system 700.

Software may be stored in a computer program product and loaded into the computing device 700 using the removable storage drive 717, the storage drive 712, or the interface 750. The computer program product may be a non-transitory computer readable medium. Alternatively, the computer program product may be downloaded to the computer system 700 over the communications path 726. The software, when executed by the processor 707, causes the computing device 700 to perform the necessary operations to execute the method 100, as shown in FIG. 1.

It is to be understood that the embodiment of FIG. 7 is presented merely by way of example to explain the operation and structure of the network switch. Therefore, in some embodiments, one or more features of the computing device 700 may be omitted. Also, in some embodiments, one or more features of the computing device 700 may be combined together. Additionally, in some embodiments, one or more features of the computing device 700 may be split into one or more component parts.

When used to realise the server 200 of FIG. 2, the processor 707 and computer program code stored in the memory 708 are configured to cause the server 200 to receive an indication of the beneficiary account to which a monetary amount is to be credited. The processor 707 and computer program code stored in the memory 708 are further configured to cause the server 200 to receive an indication of the monetary amount by which to credit the beneficiary account and compare the monetary amount against records of past amounts credited into other beneficiary accounts. The records are stored in a database of the server 200. The processor 707 and computer program code stored in the memory 708 are further configured to cause the server 200 to generate a result of the comparison.

The server 200 is further configured to credit the beneficiary account with the monetary amount, wherein the result of the comparison may be generated before or after the crediting of the beneficiary account. The server 200 is then further configured to receive an adjustment of the monetary amount to credit the beneficiary account in response to the result of the comparison. The monetary amount to which the beneficiary account is then credited may be different from the monetary amount received by the server to perform the comparison in response to the results of the comparison. The other beneficiary accounts used for the comparison may each have a profile that matches the beneficiary account to which the monetary amount is to be credited. A group of details comprising any one or more of: age; gender; address; household category; and school may be used to determine the profile match.

The server 200 is further configured to provide a list of payment vehicles through which the beneficiary account is debited from payments made from the beneficiary account and receive an indication of selected one(s) of the payment vehicles. The server 200 may then be further configured to provide the selected one(s) of the payment vehicles with at least one restriction that controls access to the monetary amount credited into the beneficiary account. The at least one restriction may be selected from a group comprising any one or more of: transaction limit; frequency of transaction; and transaction category.

The server 200 is further configured to designate an account from which the monetary amount is deducted to credit the beneficiary account. The designated account may then be further configured to deduct the monetary amount in accordance with a schedule.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects to be illustrative and not restrictive.

With that said, it should be appreciated that one or more aspects of the present disclosure transform a general-purpose computing device into a special-purpose computing device when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure

What is claimed is:

1. A method for crediting a monetary amount to a beneficiary account from which payments are made, the method comprising:
    receiving, by a server, (a) an identification of the beneficiary account to which a monetary amount from a donor is to be credited and (b) an indication of the monetary amount, the beneficiary account associated with a profile;
    identifying, by the server, other profiles associated with other beneficiary accounts, based on at least one consistency between the profile associated with the beneficiary account and the other profiles, the other profiles associated with records of past amounts from other donors credited into the other beneficiary accounts, the records being stored in a database of the server;
    comparing, by the server, the indicated monetary amount against the records of the past amounts from the other donors credited into the other beneficiary accounts;
    generating, by the server, a result of the comparison, the result representative of the indicated monetary amount measured against the past amounts from the other donors credited into the other beneficiary accounts;
    altering the indicated monetary amount based on input from the donor in response to the result; and
    crediting the beneficiary account with the altered monetary amount.

2. The method of claim 1, wherein the result of the comparison is generated before the crediting of the beneficiary account.

3. The method of claim 2, wherein the altered monetary amount to which the beneficiary account is credited is different from the indicated monetary amount received by the server.

4. The method of claim 1, further comprising:
    providing a list of payment vehicles through which the beneficiary account is debited from payments made from the beneficiary account; and
    receiving an indication of selected one(s) of the payment vehicles.

5. The method of claim 4, further comprising configuring the selected one(s) of the payment vehicles with at least one restriction that controls access to the monetary amount credited into the beneficiary account;
    wherein the at least one restriction is selected from a group comprising any one or more of: transaction limit; frequency of transaction; and/or transaction category.

6. The method of claim 1, wherein a group of details comprising any one or more of: age; gender; address; household category; and/or school is used to determine the at least one consistency.

7. The method of claim 1, further comprising designating, at the server, an account from which the monetary amount is deducted to credit the beneficiary account.

8. The method of claim 7, further comprising configuring the designated account to deduct the monetary amount in accordance with a schedule.

9. A server for administering the crediting of a beneficiary account from which payments are made, the server comprising:
    at least one processor; and
    at least one memory including computer program code;
    wherein the at least one memory and the computer program code are configured to, with the at least one processor, cause the server at least to:
    receive an indication of the beneficiary account to which a monetary amount from a donor is to be credited, the beneficiary account associated with a profile;
    receive an indication of the monetary amount to credit the beneficiary account;
    identify other profiles associated with other beneficiary accounts, based on at least one consistency between the profile associated with the beneficiary account and the other profiles, the other profiles associated with records of past amounts from other donors credited into the other beneficiary accounts, wherein the at least one memory further includes a database including the records;
    compare the indicated monetary amount against the records of the past amounts credited into other beneficiary accounts;
    generate a result of the comparison; and
    credit the beneficiary account with the monetary amount.

10. The server of claim 9, wherein the at least one memory and the computer program code are configured to, with the at least one processor, cause the server to generate the result of the comparison before crediting the beneficiary account.

11. The server of claim 10, wherein the at least one memory and the computer program code are configured to, with the at least one processor, cause the server to receive an adjustment of the monetary amount from the donor to credit into the beneficiary account in response to the result of the comparison.

12. The server of claim 10, wherein the monetary amount to which the beneficiary account is credited is different from the monetary amount received by the server.

13. The server of claim 9, wherein the at least one memory and the computer program code are configured to, with the at least one processor, cause the server to:

provide a list of payment vehicles through which the beneficiary account is debited from payments made from the beneficiary account; and receive an indication of selected one(s) of the payment vehicles.

14. The server of claim 13, wherein the at least one memory and the computer program code are configured to, with the at least one processor, cause the server to configure the selected one(s) of the payment vehicles with at least one restriction that controls access to the monetary amount credited into the beneficiary account; and wherein the at least one restriction is selected from a group comprising any one or more of: transaction limit; frequency of transaction; and/or transaction category.

15. The server of claim 9, wherein the at least one memory and the computer program code are configured to, with the at least one processor, cause the server to, in connection with identifying the other profiles, determine the at least one consistency based on a group of details comprising any one or more of: age; gender; address; household category; and/or school.

16. The server of claim 9, wherein the at least one memory and the computer program code are configured to, with the at least one processor, cause the server to designate an account from which the monetary amount is deducted to credit the beneficiary account.

17. The server of claim 16, wherein the at least one memory and the computer program code are configured to, with the at least one processor, cause the server to configure the designated account to deduct the monetary amount in accordance with a schedule.

* * * * *